US011082669B2

(12) United States Patent
Hirasawa

(10) Patent No.: US 11,082,669 B2
(45) Date of Patent: Aug. 3, 2021

(54) IMAGE PROJECTION APPARATUS, IMAGE PROCESSING APPARATUS, IMAGE PROJECTION METHOD, IMAGE PROCESSING METHOD, AND IMAGE PROJECTION SYSTEM

(71) Applicant: SONY CORPORATION, Tokyo (JP)

(72) Inventor: Yasutaka Hirasawa, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/620,934

(22) PCT Filed: Apr. 9, 2018

(86) PCT No.: PCT/JP2018/014916
§ 371 (c)(1),
(2) Date: Dec. 10, 2019

(87) PCT Pub. No.: WO2018/235392
PCT Pub. Date: Dec. 27, 2018

(65) Prior Publication Data
US 2020/0204766 A1  Jun. 25, 2020

(30) Foreign Application Priority Data

Jun. 19, 2017  (JP) .............................. JP2017-119433

(51) Int. Cl.
*H04N 9/31* (2006.01)
(52) U.S. Cl.
CPC ......... *H04N 9/3138* (2013.01); *H04N 9/3167* (2013.01); *H04N 9/3185* (2013.01)
(58) Field of Classification Search
CPC .............................. G02F 1/116; H04N 9/3167
See application file for complete search history.

(56) References Cited

U.S. PATENT DOCUMENTS 5,975,703 A * 11/1999 Holman ............. G03B 21/2073
349/9
6,113,239 A * 9/2000 Sampsell ............. H04N 9/3167
348/E9.027
(Continued)

FOREIGN PATENT DOCUMENTS

CN  107209442 A  9/2017
CN  107533763 A  1/2018
(Continued)

OTHER PUBLICATIONS

Shibata, et al., "Uniaxial 3D Profilometry by Projecting Polarization Pattern", Japan Society of Professional Engineers, 2014, pp. 109-110.(Translation of abstract only).
(Continued)

*Primary Examiner* — Paulos M Natnael
(74) *Attorney, Agent, or Firm* — Chip Law Group

(57) ABSTRACT

An image projection apparatus 20 performs spatial light modulation on unpolarized light indicating a projected image, generates projection light set into a polarization state based on a superimposed image, and projects the projection light onto a surface of projection 50. An image processing apparatus 40 calculates each direction of polarization in units of pixels using polarization images in at least three or more directions of polarization acquired by imaging the surface of projection 50 onto which the projection light is projected. Furthermore, the image processing apparatus 40 converts the calculated direction of polarization into a pixel value, and generates a reconstructed image. It is, therefore, possible to generate the projection light indicating the superimposed image invisibly superimposed on the projected image, and to visibly reconstruct the superimposed image from a captured image of the surface of projection onto which the projection light is projected.

16 Claims, 14 Drawing Sheets

(56) References Cited

U.S. PATENT DOCUMENTS

| | | | | |
|---|---|---|---|---|
| 6,320,658 | B1* | 11/2001 | Mizutani | G03F 9/7026 250/548 |
| 6,377,237 | B1* | 4/2002 | Sojourner | G09G 3/3406 345/102 |
| 10,742,941 | B2* | 8/2020 | Kyosuna | G03B 21/005 |
| 2007/0070508 | A1* | 3/2007 | Ruhle | G02B 27/0172 359/630 |
| 2007/0086762 | A1* | 4/2007 | O'Keefe | A61B 1/247 396/16 |
| 2010/0060960 | A1* | 3/2010 | Tanaka | G11B 7/0065 359/11 |
| 2012/0026856 | A1* | 2/2012 | Shimada | G03H 1/26 369/103 |
| 2012/0182407 | A1* | 7/2012 | Yoshida | H04N 13/31 348/54 |
| 2013/0127980 | A1* | 5/2013 | Haddick | G02B 27/0093 348/14.08 |
| 2014/0055487 | A1* | 2/2014 | Kiyo | G06T 11/60 345/629 |
| 2014/0176912 | A1* | 6/2014 | Turner | G02B 27/286 353/8 |
| 2017/0041581 | A1* | 2/2017 | Ikeda | G06F 3/167 |
| 2018/0013991 | A1* | 1/2018 | Homma | G03B 21/145 |
| 2019/0086674 | A1* | 3/2019 | Sinay | G02B 27/0172 |
| 2019/0302964 | A1* | 10/2019 | Kyosuna | G06F 3/011 |
| 2020/0004115 | A1* | 1/2020 | Kyosuna | H04N 9/3182 |
| 2020/0186788 | A1* | 6/2020 | Shimizu | H04N 9/3188 |

FOREIGN PATENT DOCUMENTS

| | | |
|---|---|---|
| JP | 2003-248195 A | 9/2003 |
| JP | 2015-046848 A | 3/2015 |
| KR | 10-2017-0115045 A | 10/2017 |
| WO | 2016/125221 A1 | 8/2016 |
| WO | 2016/181687 A1 | 11/2016 |

OTHER PUBLICATIONS

International Search Report and Written Opinion of PCT Application No. PCT/JP2018/014916, dated Jun. 19, 2018, 10 pages of ISRWO.

Shibata, et al., "Uniaxial 3D profilometry by projecting polarization pattern", Annual Meeting of the Japan Society for Precision Engineering Spring Conference(JSPE), 2014, pp. 109-110.

* cited by examiner

IMAGE PROJECTION APPARATUS, IMAGE PROCESSING APPARATUS, IMAGE PROJECTION METHOD, IMAGE PROCESSING METHOD, AND IMAGE PROJECTION SYSTEM

CROSS REFERENCE TO RELATED APPLICATIONS

This application is a U.S. National Phase of International Patent Application No. PCT/JP2018/014916 filed on Apr. 9, 2018, which claims priority benefit of Japanese Patent Application No. JP 2017-119433 filed in the Japan Patent Office on Jun. 19, 2017. Each of the above-referenced applications is hereby incorporated herein by reference in its entirety.

TECHNICAL FIELD

This technique relates to an image projection apparatus, an image processing apparatus, an image projection method, an image processing method, and an image projection system, and aims to be capable of generating projection light indicating a superimposed image invisibly superimposed on a projected image and visibly reconstructing the superimposed image from a captured image of a surface of projection onto which the projection light is projected.

BACKGROUND ART

Conventionally, because of incapability to distinguish images when a plurality of images is superimposed and projected, a plurality of images has been displayed in a time division manner or a display region has been divided to project a plurality of images onto different regions.

Furthermore, projection of a polarized light pattern is also performed in image projection. For example, NPL 1 describes making three-dimensional measurement by performing polarized light pattern projection while spatially controlling a polarization state of light using an SLM: Spatial Light Modulator, and imaging this projected polarized light pattern with a polarization camera into which a polarized light filter having a direction of polarization varying depending on each pixel is incorporated.

CITATION LIST

Non Patent Literature

[NPL 1]
Shuhei SHIBATA, Fumio KOBAYASHI, Daisuke BARADA, and Yukitoshi OTANI (2014). Uniaxial 3D profilometry by projecting polarization pattern, Proceedings of 2014 JSPE (The Japan Society for Precision Engineering) Spring Meeting, [online] Retrieved Jun. 1, 2017, from https://www.jstage.jst.go.jp/article/pscjspe/2014S/0/2014S_109/_pdf.

SUMMARY

Technical Problems

Meanwhile, in a case of displaying the plurality of images in a time division manner, it is impossible to simultaneously acquire information indicated by the plurality of images. In addition, in a case of dividing the display region to display the plurality of images, it is impossible to display enlarged images. Furthermore, an unnecessary image for a viewer of an image content or the like, for example, an image for adjustment is often projected. Moreover, with a scheme of NPL 1, luminance values of images in the different directions of polarization are used as patterns as they are. Thus, generating shadows on light to be projected makes it impossible to acquire correct patterns.

An object of this technique is, therefore, to provide an image projection apparatus for generating projection light indicating a superimposed image invisibly superimposed on a projected image, and an image processing apparatus for visibly reconstructing a superimposed image from a captured image of a surface of projection onto which projection light is projected, as well as an image projection method, an image processing method, and an image processing system.

Solution to Problems

According to a first aspect of this technique,
there is provided an image projection apparatus including:
a spatial light modulation section that sets a polarization state based on a superimposed image to unpolarized light indicating a projected image, and that generates projection light.

According to this technique, a polarization control section calculates a direction of polarization on the basis of a pixel value for each pixel of the superimposed image superimposed on the projected image. The direction of polarization is a direction that varies depending on the pixel value within a range smaller than 180 degrees. The spatial light modulation section performs spatial light modulation for setting the polarization state to the unpolarized light indicating the projected image so that the polarization state is the direction of polarization calculated on the basis of the pixel value of the superimposed image, and generates the projection light. Furthermore, in a case in which image light indicating the projected image is polarized light, a polarization cancellation section is provided to process the image light indicating the projected image into the unpolarized light. The superimposed image may be either an image that indicates information associated with the projected image or a pattern image that is not associated with the projected image.

According to a second aspect of this technique,
there is provided an image projection method including:
generating unpolarized light indicating a projected image; and
setting a polarization state based on a superimposed image to the unpolarized light, and generating projection light.

According to a third aspect of this technique,
there is provided an image processing apparatus including:
a direction-of-polarization calculation section that calculates each direction of polarization in units of pixels using polarization images in at least three or more directions of polarization; and
a conversion processing section that converts the direction of polarization calculated by the direction-of-polarization calculation section into a pixel value, and that generates a reconstructed image.

According to this technique, the direction-of-polarization calculation section calculates the direction of polarization in units of pixels using the polarization images in at least three or more directions of polarization. An imaging section that acquires the polarization images may be configured to have a polarizing plate that is rotatably provided on a subject light incidence surface, or may be configured to have a polarized light filter that is provided on an incidence surface of an imaging element and that is in a pixel array containing polarization pixels in at least three or more directions of polarization. Furthermore, the imaging section may be provided as at least three or more imaging sections, polarizing plates having different directions of polarization each other may be provided on subject light incidence surfaces of the imaging sections, and the polarization images in at least three or more directions of polarization may be acquired.

Moreover, a surface-of-projection information generation section is further provided, the direction-of-polarization calculation section calculates the direction of polarization using the polarization images obtained by imaging a surface of projection, and the surface-of-projection information generation section generates surface-of-projection information associated with the surface of projection using the reconstructed image generated by the conversion processing section. For example, the direction-of-polarization calculation section calculates the direction of polarization for each viewpoint using the polarization images obtained by imaging the surface of projection at a plurality of viewpoints, and the conversion processing section generates the reconstructed image for each viewpoint. The surface-of-projection information generation section generates the surface-of-projection information, for example, depth information indicating a distance to the surface of projection, using the reconstructed image generated by the conversion processing section for each viewpoint. Moreover, projection light generated by setting a polarization state based on a predetermined pattern image to unpolarized light is projected onto the surface of projection. The surface-of-projection information generation section generates the surface-of-projection information using the predetermined pattern image and the reconstructed pattern image generated by the conversion processing section.

According to a fourth aspect of this technique,
there is provided an image processing method including:
calculating each direction of polarization in units of pixels using polarization images in at least three or more directions of polarization; and
converting the calculated direction of polarization into a pixel value, and generating an image signal.

According to a fifth aspect of this technique,
there is provided an image projection system including:
an image projection apparatus and an image processing apparatus, in which
the image projection apparatus includes
a spatial light modulation section that sets a polarization state based on a superimposed image to unpolarized light indicating a projected image, and that generates projection light, and
the image processing apparatus includes
a direction-of-polarization calculation section that calculates each direction of polarization in units of pixels using polarization images in at least three or more directions of polarization acquired by imaging a surface of projection onto which the projection light generated by the image projection apparatus is projected, and
a conversion processing section that converts the direction of polarization calculated by the direction-of-polarization calculation section into a pixel value, and that generates an image signal indicating the superimposed image.

According to this technique, the spatial light modulation section in the image projection apparatus sets the polarization state based on the superimposed image to the unpolarized light indicating the projected image, and generates the projection light. The direction-of-polarization calculation section in the image processing apparatus calculates each direction of polarization in units of pixels using the polarization images in at least three or more directions of polarization acquired by imaging a surface of projection onto which the projection light generated by the image projection apparatus is projected. Here, the image projection apparatus generates and projects the projection light or the image processing apparatus sets an angle of view at a time of imaging the surface of projection so that a to-be-imaged region imaged with pixels in a minimum unit region in which the direction of polarization can be calculated at the time of imaging the surface of projection is equal to or smaller in region size than a minimum modulation region on the surface of projection. The conversion processing section converts the direction of polarization calculated by the direction-of-polarization calculation section into a pixel value, and generates an image signal indicating the superimposed image.

Advantageous Effects of Invention

According to this technique, the spatial light modulation section in the image projection apparatus sets the polarization state based on the superimposed image to the unpolarized light indicating the projected image, and generates the projection light. The direction-of-polarization calculation section in the image processing apparatus calculates each direction of polarization in units of pixels using the polarization images in at least three or more directions of polarization acquired by imaging the surface of projection onto which the projection light is projected. The conversion processing section converts the direction of polarization calculated by the direction-of-polarization calculation section into the pixel value, and generates the reconstructed image. Therefore, it is possible to generate the projection light indicating the superimposed image invisibly superimposed on the projected image, and to visibly reconstruct the superimposed image from the captured image of the surface of projection onto which the projection light is projected. The advantages described in the present specification are given as an example only, and the advantages are not limited to those described in the present specification and may contain additional advantages.

DESCRIPTION OF EMBODIMENT

Modes for carrying out the present technique will be described hereinafter. It is noted that description will be given in the following order.

1. Configuration of Image Projection System
2. Configuration and Operations of Image Projection Apparatus
3. Configuration and Operations of Image Processing Apparatus
4. First Application Example of Image Projection System
5. Second Application Example of Image Projection System
6. Third Application Example of Image Projection system <1. Configuration of Image Projection System>

Figure 1:
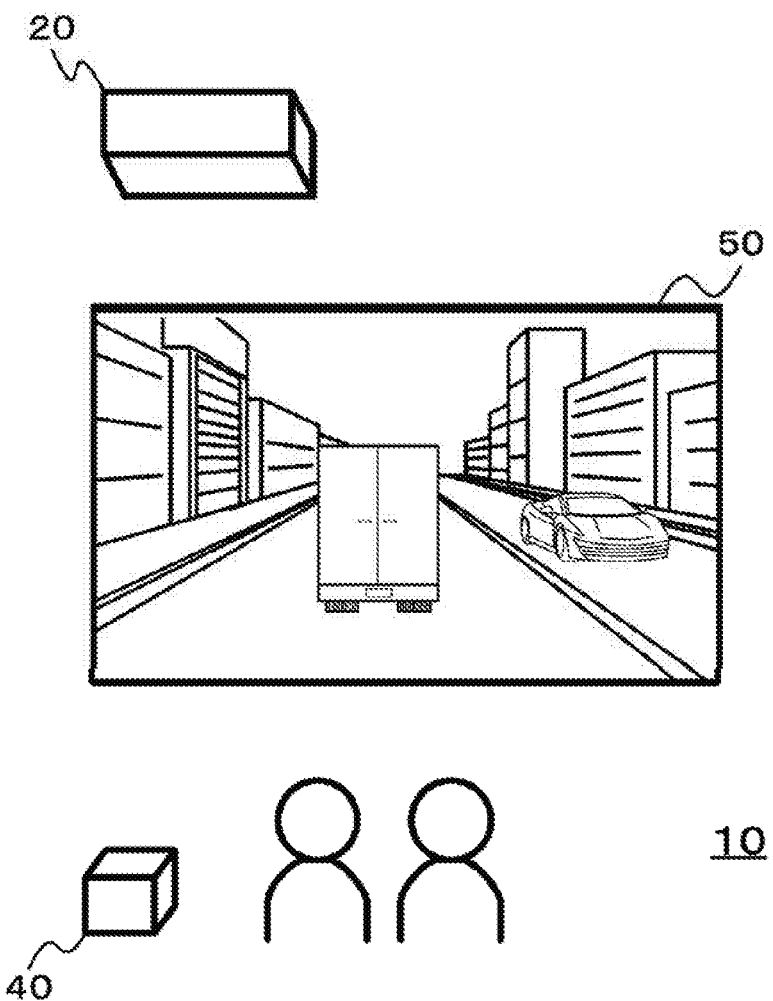
FIG. 1 is a diagram depicting an example of a configuration of an image projection system.

FIG. 1 depicts an example of a configuration of an image projection system. An image processing system 10 has an image projection apparatus 20 and an image processing apparatus 40. The image projection apparatus 20 sets a polarization state based on a superimposed image to unpolarized light indicating a projected image, generates projection light, and projects the projection light onto a surface of projection (for example, screen) 50. The image processing apparatus 40 calculates each direction of polarization in units of pixels using polarization images in at least three or more directions of polarization acquired by imaging the surface of projection 50. Furthermore, the image processing apparatus converts the calculated direction of polarization into a pixel value, and reconstructs a reconstructed image. Here, making a relationship between a luminance and a direction of polarization in the image projection apparatus 20 equal to that in the image processing apparatus 40 enables the reconstructed image generated by the image processing apparatus 40 to be identical to the superimposed image used in the image projection apparatus 20. In other words, the image processing system 10 generates projection light indicating only a projected image visible to the naked eye and the superimposed image invisible to the naked eye, projects the projection light onto the surface of projection when displaying the projected image on the surface of projection so that the superimposed image invisibly superimposed on the projected image can be visibly reconstructed from a captured image of the surface of projection onto which the projection light is projected.

<2. Configuration and Operations of Image Projection Apparatus>

Figure 2:
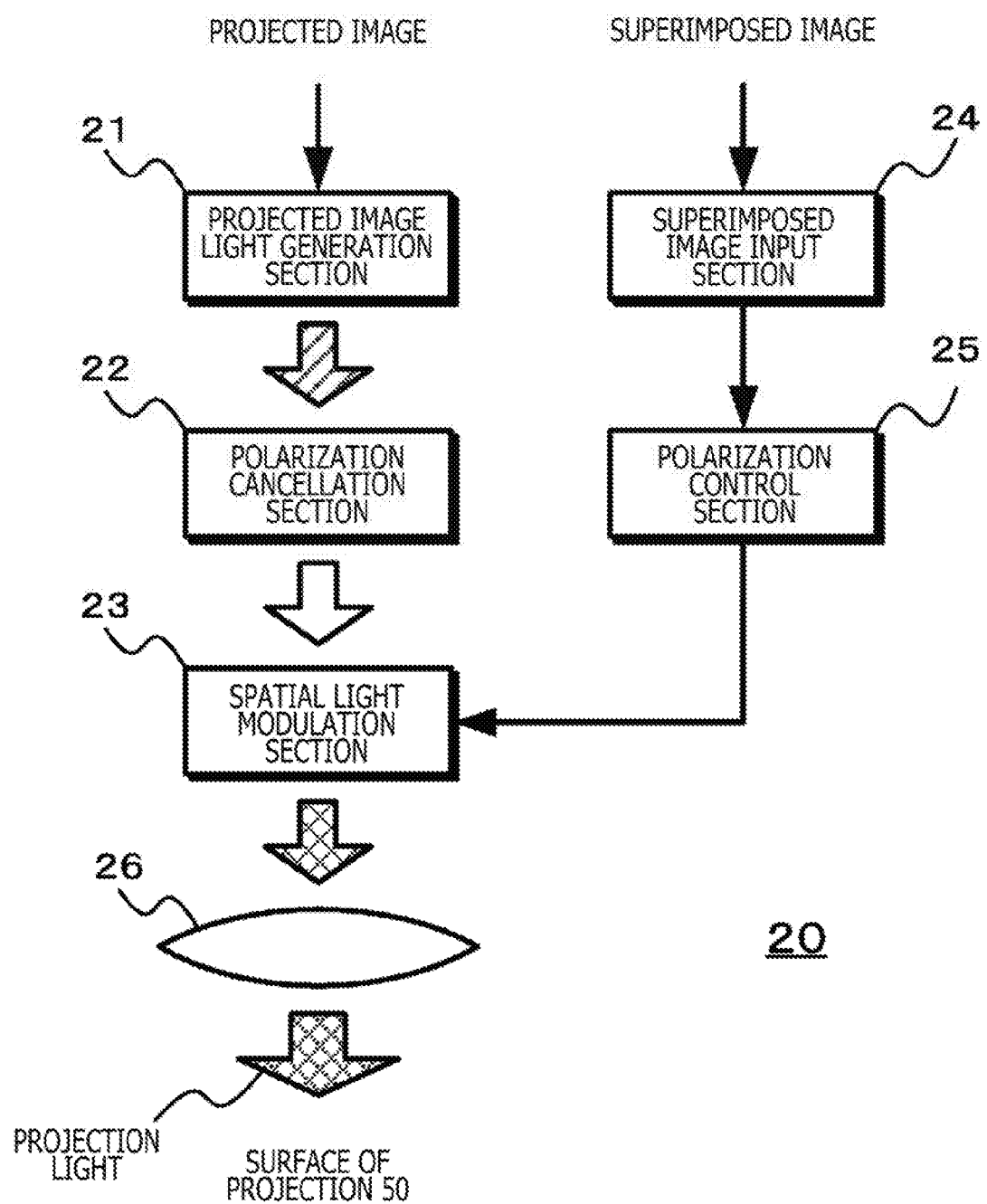
FIG. 2 is a diagram depicting an example of a configuration of an image projection apparatus.

FIG. 2 depicts an example of a configuration of the image projection apparatus. The image projection apparatus 20 is configured with a projected image light generation section 21, a polarization cancellation section 22, a spatial light modulation section 23, a superimposed image input section 24, a polarization control section 25, and a projection lens 26.

The projected image light generation section 21 generates projected image light. The projected image light generation section 21 has a light source, a lens section, and an image formation section. Light emitted from the light source is transformed into parallel light by the lens section and transmitted through the image formation section, thereby generating the projected image light. The image formation section is configured with, for example, transmissive liquid crystal or reflective liquid crystal. The image formation section causes the transmissive liquid crystal on which a projected image is displayed or the reflective liquid crystal on which the projected image is displayed to transmit or reflect the parallel light, and generates the projected image light. It is noted that the projected image light is in a state in which the polarization state varies depending on a pixel due to an influence of the liquid crystal in a case of generating the projected image light using either the transmissive liquid crystal or the reflective liquid crystal. The projected image light generation section 21 emits the generated projected image light to the spatial light modulation section 23 via the polarization cancellation section 22.

The polarization cancellation section 22 emits the incident polarized light as unpolarized light. The polarization cancellation section 22 is configured with, for example, a highly birefringent film, and emits the projected image light generated by the projected image light generation section 21 to the spatial light modulation section 23 as projected image light in an unpolarized light state. It is noted that the polarization cancellation section 22 may be configured to function to process the polarized light into the unpolarized light, and a configuration of the polarization cancellation section 22 is not limited to the configuration with the highly birefringent film or the like. Furthermore, in a case in which the projected image light generation section 21 generates projected image light in the unpolarized light state, for example, in a case in which unpolarized light emitted from the light source is transmitted through a photographic film or the like and the projected image light is generated, it is not always necessary to provide the polarization cancellation section 22.

The spatial light modulation section 23 sets a polarization state based on the superimposed image to the unpolarized light indicating the projected image, and generates projection light. The spatial light modulation section 23 is configured with, for example, transmissive liquid crystal or reflective liquid crystal, and performs spatial light modulation on the basis of a polarization control signal from the polarization control section 25 to be described later. In other words, the spatial light modulation section 23 sets a polarization state of the projected image light in the unpolarized light state supplied from the projected image light generation section 21 via the polarization cancellation section 22 into a linear polarization state in a direction of polarization in response to each pixel value of the superimposed image. The spatial light modulation section 23 emits the projection light the polarization state of which is set in response to the superimposed image to the projection lens 26.

The superimposed image input section 24 receives an image signal of the superimposed image to be superimposed on the projected image, and outputs the image signal to the polarization control section 25. The superimposed image may be an image that indicates information associated with the projected image or a pattern image that is not associated with the projected image.

The polarization control section 25 converts the pixel value of the superimposed image supplied from the superimposed image input section 24 into a direction of polarization varying depending on the pixel value within a range smaller than 180 degrees, and generates the polarization control signal in response to the direction of polarization after conversion. In addition, the polarization control section 25 outputs the generated polarization control signal to the spatial light modulation section 23 to control the spatial light modulation section 23 to perform the spatial light modulation described above.

The projection lens 26 projects the projection light which indicates the projected image and the polarization state of which is set on the basis of the superimposed image, at a desired projection size with a focus on the surface of projection.

Figure 3:
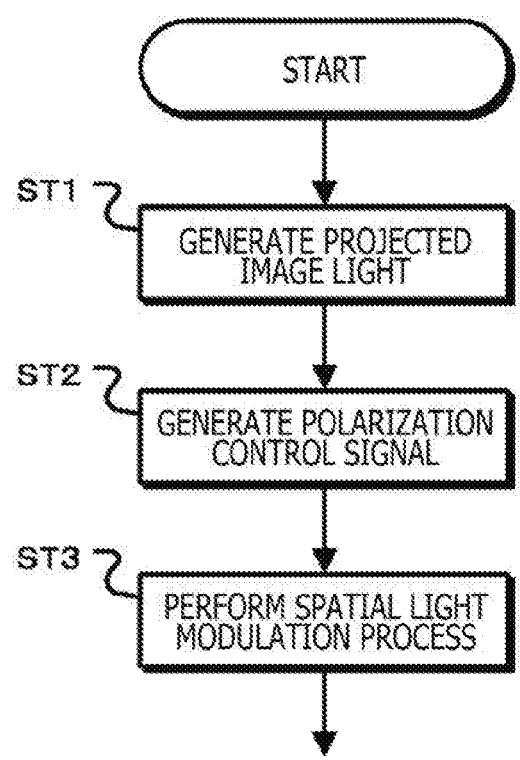
FIG. 3 is a flowchart depicting operations performed by the image projection apparatus.

FIG. 3 is a flowchart depicting operations performed by the image projection apparatus. In Step ST1, the image projection apparatus generates the projected image light. The image projection apparatus 20 generates the projected image light in the unpolarized light state indicating the projected image, and goes to Step ST2.

In Step ST2, the image projection apparatus generates the polarization control signal. The image projection apparatus 20 receives the superimposed image and converts a pixel value of each pixel of the superimposed image into the direction of polarization. Furthermore, the image projection apparatus 20 generates the polarization control signal to exercise control such that the projected image light as the unpolarized light is set into the polarization state in the direction of polarization after the conversion, and goes to Step ST3.

In Step ST3, the image processing apparatus performs a spatial light modulation process. The image projection apparatus 20 performs spatial light modulation on the projected image light as the unpolarized light generated in Step ST1 on the basis of the polarization control signal generated in Step ST2, and sets the polarization state into the linear polarization state in the direction of polarization in response to the pixel value of the superimposed image. In this way, the image projection apparatus performs the spatial light modulation on the projected image light and generates the projection light.

Figure 4:
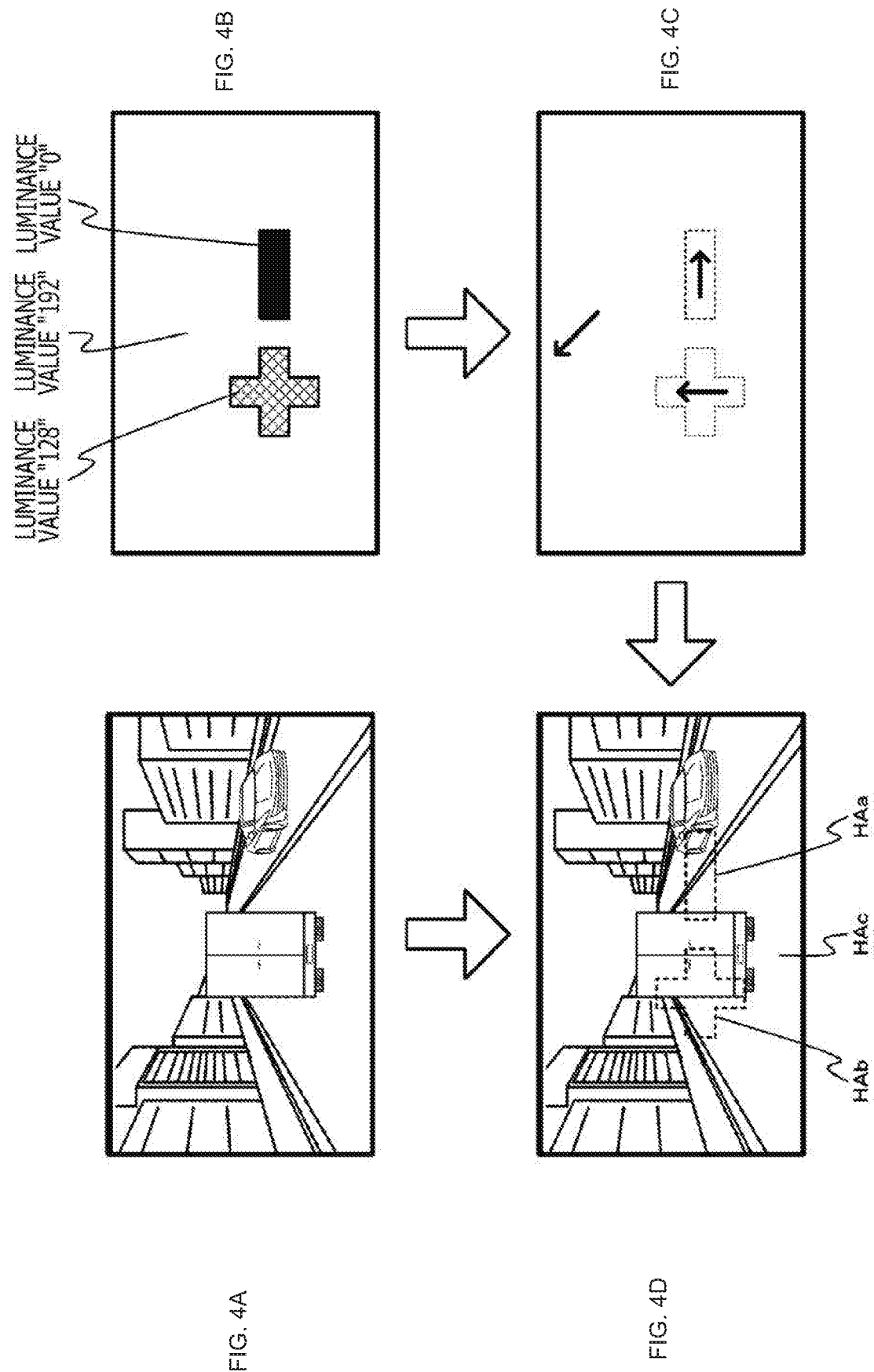
FIGS. 4A, 4B, 4C, and 4D is a are diagrams depicting an example of operations performed by the image projection apparatus.

FIGS. 4A, 4B, 4C, and 4D depict an example of operations performed by the image projection apparatus. FIG. 4A depicts an example of the projected image, and FIG. 4B depicts an example of the superimposed image. It is noted that each projected image and superimposed image may be either a moving image or a still image.

Figure 5:
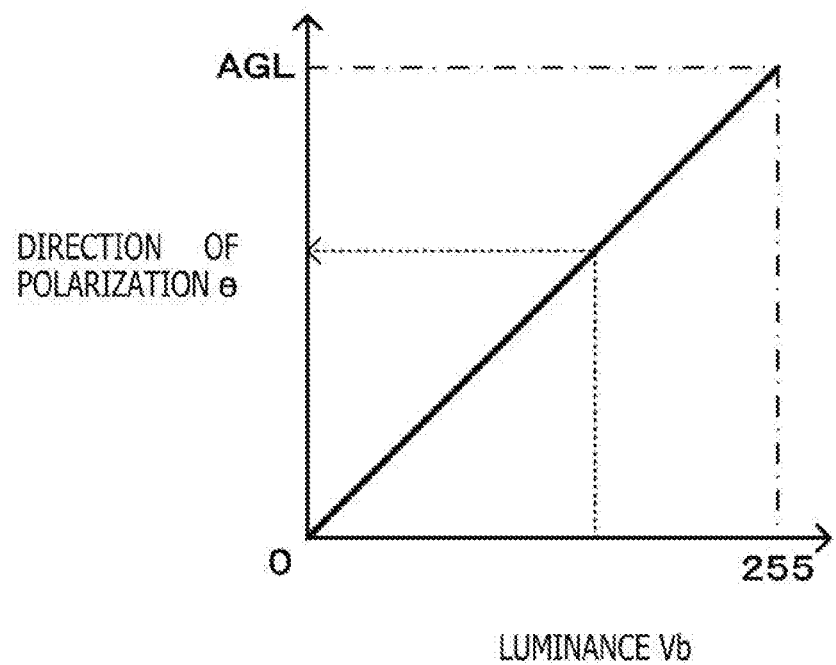
FIG. 5 is a diagram depicting a relationship of a direction of polarization θ with a luminance value Vb.

The image projection apparatus converts each pixel value of the superimposed image into the direction of polarization using, for example, a conversion rule. The polarization control section 25 in the image projection apparatus 20 determines the direction of polarization on the basis of Equation (1). It is assumed, for example, that each pixel value, for example, luminance value Vb of the superimposed image is "0 to 255" and a direction of polarization θ is "0 to AGL." An angle AGL is within a range of "0<AGL<180 degrees" and desirably closer to 180 degrees for enhancing resolving power in the direction of polarization. It is noted that FIG. 5 depicts a relationship of the direction of polarization θ with the luminance value Vb.

$$\theta = (AGL/256) \times Vb \qquad (1)$$

The direction of polarization of a rectangular region at a luminance value "0" in FIG. 4B is, therefore, "0 degrees" as depicted in FIG. 4C. Furthermore, the direction of polarization of a crisscross region at a luminance value "128" is, for example, "89.5 degrees," and the direction of polarization of a region at a luminance value "192" is, for example, "134.2 degrees." The spatial light modulation section 23 performs the spatial light modulation on the unpolarized light indicating the projected image into polarization states depicted in FIG. 4C on the basis of the polarization control signal from the polarization control section 25, and generates the projection light. Therefore, as depicted in FIG. 4D, in a display image when the projection light is projected onto the surface of projection, a display region HAa corresponding to the rectangular region at the luminance value "0" in the superimposed image is displayed in the linear polarization state in which the direction of polarization is "0 degrees." Furthermore, a display region HAb corresponding to the crisscross region at the luminance value "128" in the superimposed image is displayed in the linear polarization state in which the direction of polarization is "89.5 degrees." Moreover, the other display region HAc is displayed in the linear polarization state in which the direction of polarization is "134.2 degrees."

By generating the projection light and projecting the projection light onto the surface of projection in this way, the image projection apparatus 20 can visibly project the projected image. In addition, the image projection apparatus 20 can invisibly project the superimposed image.

<3. Configuration and Operations of Image Processing Apparatus>

Figure 6:
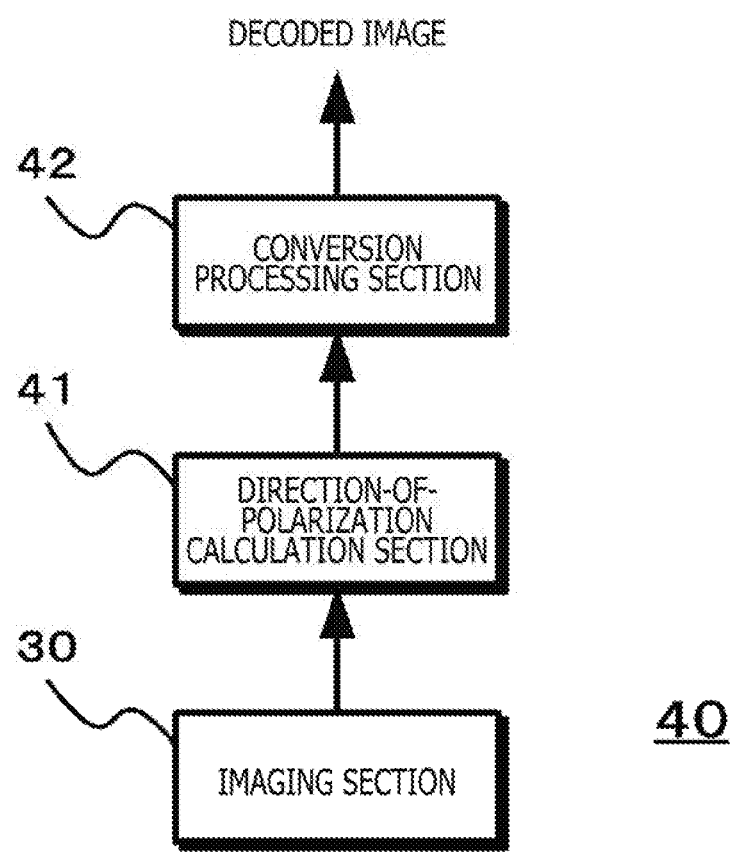
FIG. 6 is a diagram depicting an example of a configuration of an image processing apparatus.

FIG. 6 depicts an example of a configuration of the image processing apparatus. The image processing apparatus 40 is configured with a direction-of-polarization calculation section 41 and a conversion processing section 42.

The direction-of-polarization calculation section 41 calculates each direction of polarization in units of pixels using polarization images in at least three or more directions of polarization. In addition, the conversion processing section 42 converts the direction of polarization calculated by the direction-of-polarization calculation section 41 into a pixel value, and generates a reconstructed image.

It is noted that an imaging section 30 that acquires the polarization images in at least three or more directions of polarization may be configured separately from the image processing apparatus 40 or configured integrally with the image processing apparatus 40. Description will be given hereinafter on the assumption that the imaging section 30 is provided in the image processing apparatus 40.

FIGS. 7A, 7B, 7C, and 7D is a are diagrams depicting examples of a configuration of the imaging section. As depicted in, for example, FIG. 7A, an imaging section 30-1 has a polarizing plate 32 rotatably provided on a subject light incidence surface of a main body 31. The imaging section 30-1 captures a plurality of images while rotating the polarizing plate 32 and acquires the polarization images in at least three or more directions of polarization.

Figure 7A:
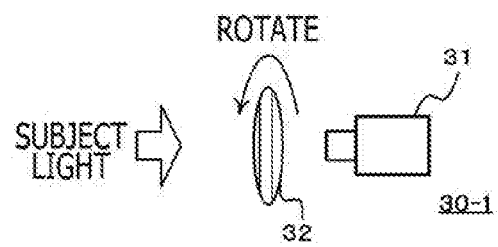
FIGS. 7A, 7B, 7C, and 7D is a are diagrams depicting examples of a configuration of an imaging section.
Figure 7B:
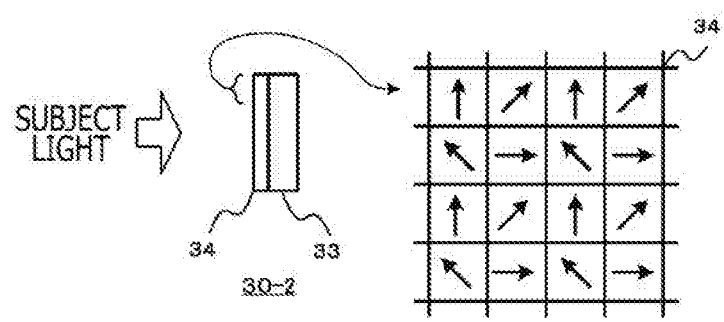

Furthermore, as depicted in FIG. 7B, an imaging section 30-2 has a polarized light filter 34 which is provided on an incidence surface of an imaging element 33 and which is in a pixel array containing polarization pixels in at least three or more directions of polarization. It is noted that FIG. 7B depicts a case in which the polarized light filter 34, in which each pixel is any of pixels in four different directions of polarization (an arrow indicates each direction of polarization), is disposed on the incidence surface of the imaging element 33. The imaging section 30-2 uses a pixel signal obtained by one imaging per direction of polarization and acquires the polarization image per direction of polarization.

Figure 7C:
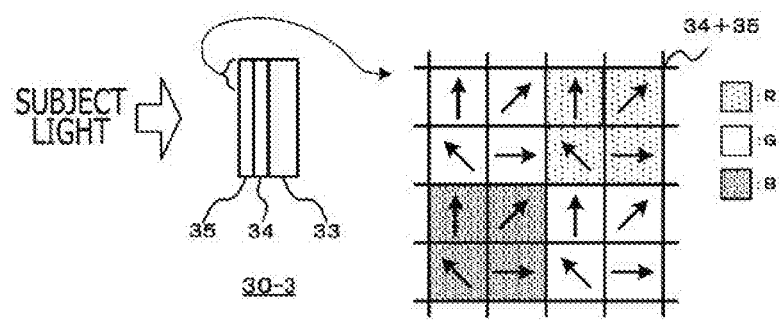

An imaging section 30-3 depicted in FIG. 7C has the polarized light filter 34 which is provided on the incidence surface of the imaging element 33 and which is in a pixel array containing polarization pixels in at least three or more directions of polarization. Furthermore, the imaging section 30-3 has a color mosaic filter 35 provided on the incidence surface of the imaging element 33. The color mosaic filter 35 is configured such that while it is assumed that a 2×2 pixel region in the imaging element 33 contains pixels of an identical color component, a 2×2 pixel region containing red (R) pixels, a 2×2 pixel region containing blue (B) pixels, and a 2×2 pixel region containing green (G) pixels are provided in a 4×4 pixel region. Furthermore, the polarized light filter 34 is provided in such a manner that each pixel in the 2×2 pixel region of the identical color component has any of the four different types of directions of polarization (an arrow indicates each direction of polarization). The imaging section 30-3 uses a pixel signal obtained by one imaging per color component and per direction of polarization, and acquires the polarization image per direction of polarization for each color component.

Figure 7D:
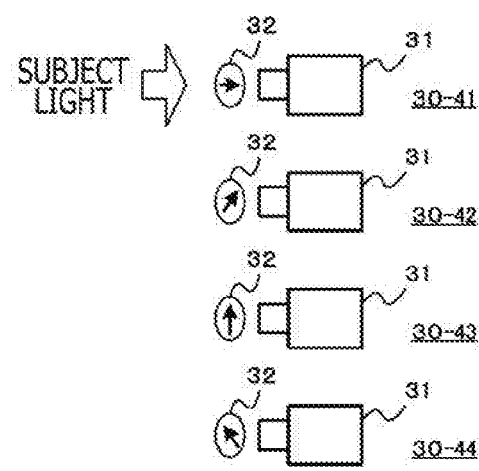

In FIG. 7D, the imaging section 30 is configured with three or more imaging sections, for example, four imaging sections 30-41 to 30-44. The polarizing plates 32 are provided on the subject light incidence surfaces of the main bodies 31 in each of the imaging sections 30-41 to 30-44 so that the polarizing plates 32 differ in direction of polarization, and the imaging sections 30-41 to 30-44 perform imaging, thereby acquiring polarization images corresponding to four directions of polarization. It is noted that FIGS. 7B, 7C, and 7D depict a case in which directions of polarization are "0 degrees," "45 degrees," "90 degrees," and "135 degrees." In addition, in a case in which the directions of polarization are three different directions of polarization, the directions of polarization are assumed to be those at equidistant intervals, for example, "0 degrees," "60 degrees," and "120 degrees."

The direction-of-polarization calculation section 41 calculates the direction of polarization on the basis of each polarization image acquired by the imaging section 30. The direction-of-polarization calculation section 41 calculates the direction of polarization on the basis of each polarization image.

It is noted that in a case in which the configuration of the imaging section is FIG. 7A or 7D, the imaging section can calculate the direction of polarization per pixel, and a minimum unit region in which the direction of polarization can be calculated is a one-pixel region. In addition, in a case in which the configuration of the imaging section is FIG. 7B or 7C, the imaging section can calculate the direction of polarization per 2×2 pixel region, and a minimum unit region in which the direction of polarization can be calculated is a 2×2 pixel region.

Figure 8:
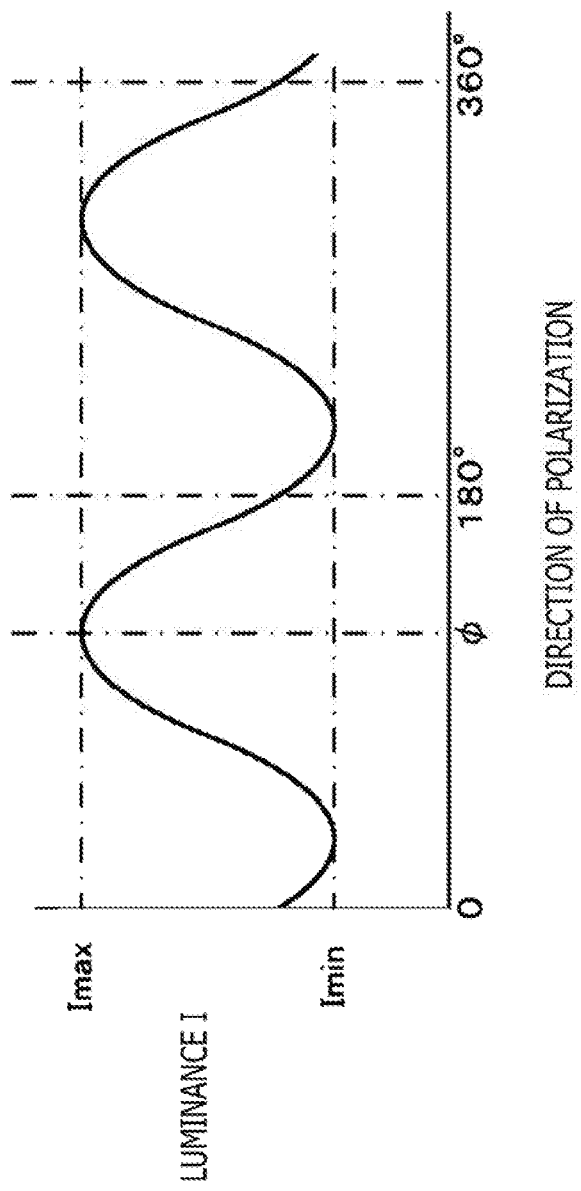
FIG. 8 is an explanatory diagram of calculation of a direction of polarization.

FIG. 8 is an explanatory diagram of calculation of the direction of polarization. In a case of capturing a display image having the direction of polarization denoted by "p" by, for example, rotating the polarizing plate of the imaging section, a luminance I of the display image changes as depicted in FIG in response to rotation of the polarizing plate. In a case of rotating the polarizing plate by 180 degrees, the polarization state returns to an original polarization state and the luminance I has a cycle of 180 degrees. Such a change of the luminance I can be expressed by Equation (2). It is assumed that a highest luminance is Imax and a lowest luminance is Imin when the polarizing plate is rotated. It is also assumed that an angle formed between each coordinate axis of a two-dimensional coordinate system and a polarization axis of the polarizing plate is an angle of polarization u when the two-dimensional coordinate system is defined on a plane surface of the polarizing plate.

[Math. 1]

$$I = \frac{I_{max} + I_{min}}{2} + \frac{I_{max} - I_{min}}{2}\cos(2\upsilon - 2\phi) \quad (2)$$

Furthermore, the luminance I becomes maximum when the polarizing plate is rotated and the direction of polarization of the display image matches a direction of polarization of the polarizing plate in the imaging section. Therefore, by using luminances of a pixel of interest in the polarization images in the three or more polarization directions to fit the luminances into a function expressed by Equation (2) and calculating the direction of polarization corresponding to the highest luminance, it is possible to calculate the direction of polarization at a position of the pixel of interest in the display image. The direction-of-polarization calculation section 41 calculates the direction or directions of polarization, for example, per pixel or per 2× pixel region, and outputs the direction or directions of polarization to the conversion processing section 42.

The conversion processing section 42 converts each direction of polarization calculated by the direction-of-polarization calculation section 41 into a pixel value. The conversion processing section 42 performs conversion that is in an opposite direction to that of the conversion performed by the polarization control section 25 in the image projection apparatus 20, converts each direction of polarization into a pixel value, and generates a reconstructed image.

Figure 9:
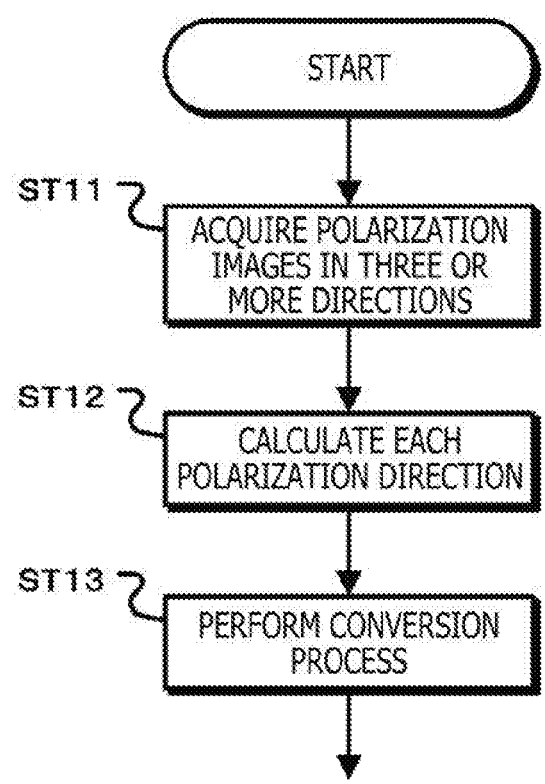
FIG. 9 is a flowchart depicting operations performed by the image processing apparatus.

FIG. 9 is a flowchart depicting operations performed by the image processing apparatus. In Step ST11, the image processing apparatus acquires polarization images in three or more directions. The image processing apparatus 40 captures the projected image projected by the image projection apparatus 20, acquires the polarization images in at least three directions of polarization, and goes to Step ST12.

In Step ST12, the image processing apparatus calculates each direction of polarization. The image processing apparatus 40 calculates the direction or directions of polarization from the polarization images in the three or more directions of polarization acquired in Step ST11 in units of pixels, for example, per pixel or per 2×2 pixels. Specifically, the image processing apparatus 40 fits each pixel value of the polarization images in the three or more directions of polarization into the function expressed by Equation (2), calculates the direction of polarization corresponding to a maximum value in the function after fitting, and goes to Step ST13.

In Step ST13, the image processing apparatus performs a conversion process. The image processing apparatus 40 converts the direction of polarization calculated in Step ST12 into a pixel value and generates a reconstructed image.

Figure 10A:
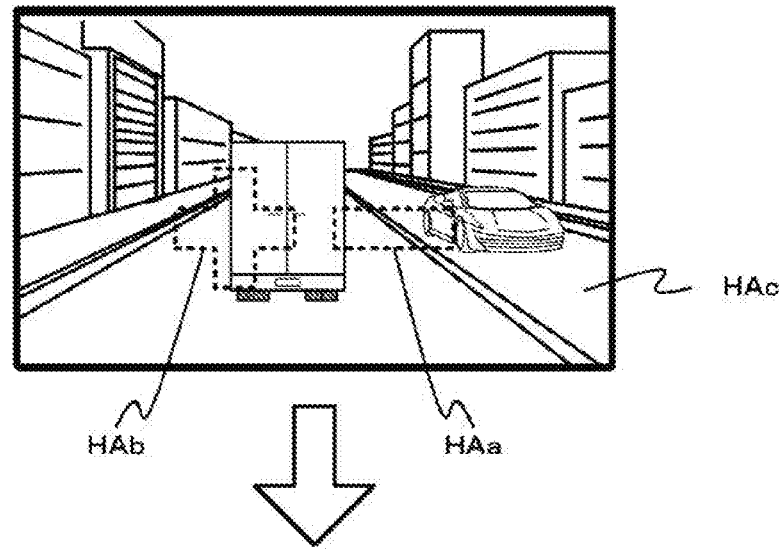
FIGS. 10A, 10B, and 10C is a are diagrams depicting an example of operations performed by the image processing apparatus.
Figure 10B:
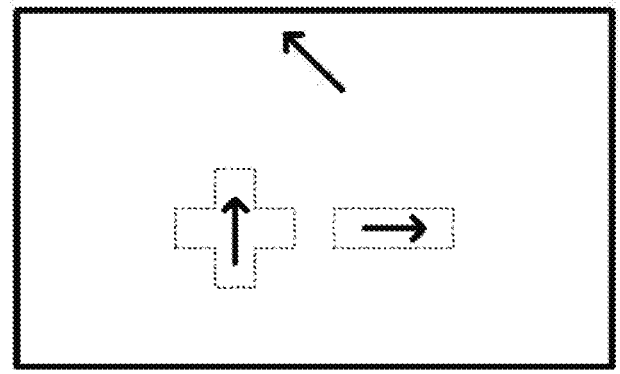
Figure 10C:
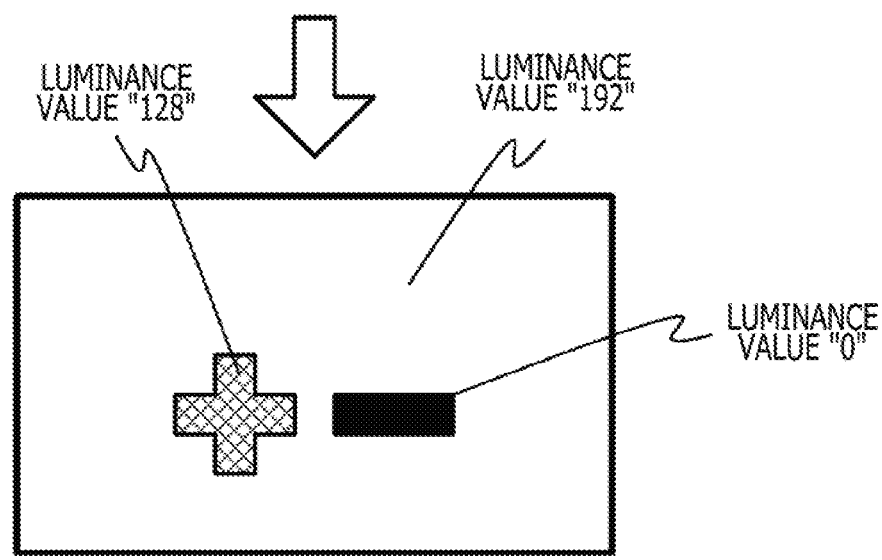

FIGS. 10A, 10B, and 10C depict an example of operations performed by the image processing apparatus. FIG. 10 depicts an example of the projected image displayed on the surface of projection. In the projected image, the rectangular display region HAa denoted by a broken line is in the linear polarization state in which the direction of polarization is "0 degrees," the crisscross display region HAb denoted by a broken line is in the linear polarization state in which the direction of polarization is "89.5 degrees," and the other display region HAc is in the linear polarization state in which the direction of polarization is "134.2 degrees."

The image processing apparatus 40 captures the projected image and acquires the polarization images in the three or more directions of polarization. In addition, the image processing apparatus 40 fits the pixels of the polarization images in the three or more directions into the function expressed by Equation (2), and calculates the direction of polarization corresponding to the highest luminance. FIG. 10B depicts the calculated directions of polarization, the rectangular region denoted by a broken line is the pixel region in the direction of polarization of "0 degrees," the crisscross region denoted by a broken line is the pixel region in the direction of polarization of "89.5 degrees," and the other region is the pixel region in the direction of polarization of "134.2 degrees."

Figure 11:
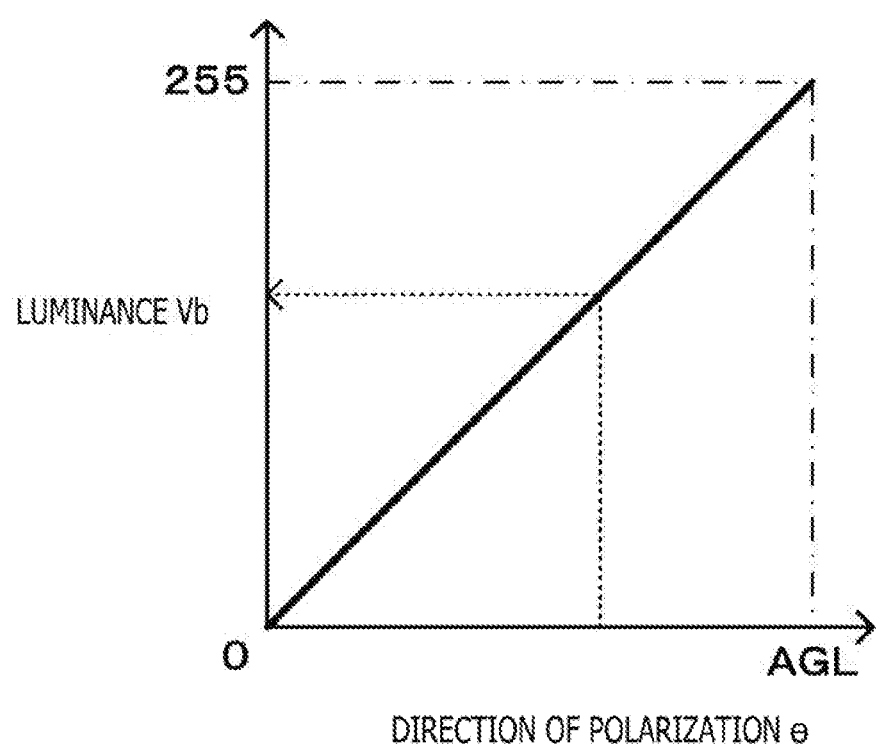
FIG. 11 is a diagram depicting a relationship of the luminance value Vb with the direction of polarization θ.

The image processing apparatus 40 converts each direction of polarization into, for example, a luminance value using, for example, a conversion rule opposite to the conversion rule used by the polarization control section 25 in the image projection apparatus 20. In a case in which the image projection apparatus 20 converts the luminance value of the superimposed image into the direction of polarization on the basis of Equation (1), the conversion processing section 42 in the image processing apparatus 40 converts the direction of polarization into the luminance value on the basis of Equation (3). It is noted that FIG. 11 depicts a relationship of the luminance value Vb with the direction of polarization θ.

$$VRb=(256/AGL) \times \theta \quad (3)$$

Performing such conversion makes it possible to generate a reconstructed image depicted in FIG. 10C. Furthermore, the conversion processing section 42 in the image processing apparatus 40 converts each direction of polarization into the luminance value using the conversion rule opposite to the conversion rule used by the polarization control section 25 in the image projection apparatus 20. Therefore, the reconstructed image is the superimposed image received by the superimposed image input section 24 in the image projection apparatus 20 and depicted in FIG. 4B.

Furthermore, supplying the image signal of the superimposed image generated by the image processing apparatus 40 to a display apparatus makes it possible to visibly display the superimposed image that is in an invisible state on the surface of projection.

In the meantime, in a case in which the direction-of-polarization calculation section 41 in the image processing apparatus 40 calculates each direction of polarization, and in a case in which image regions corresponding to a plurality of directions of polarization are contained in a to-be-imaged region imaged with pixels in a minimum unit region in which the direction of polarization can be calculated at the time of imaging the surface of projection, it is often impossible to fit each pixel value of the polarization images in the three or more directions of polarization into the function expressed by Equation (2) and to calculate each direction of polarization. Therefore, the image projection apparatus generates and projects the projection light or the image processing apparatus sets an angle of view at the time of imaging the surface of projection so that the to-be-imaged region imaged with pixels in the minimum unit region in which the direction of polarization can be calculated at the time of imaging the surface of projection is equal to or smaller, in region size, than a minimum modulation region on the surface of projection.

For example, in a case in which it is impossible to fit each pixel value of the polarization images in the three or more directions of polarization into the function expressed by Equation (2) and to calculate each direction of polarization, the image processing apparatus may set a smaller angle of view (set a higher zoom magnification) or the image projection apparatus 20 may set a larger projection size.

Setting the to-be-imaged region imaged with the pixels in the minimum unit region in which the direction of polarization can be calculated at the time of imaging the surface of projection to be equal to or smaller, in region size, than the minimum modulation region on the surface of projection in this way can further ensure the calculation of the direction of polarization.

Therefore, using the image processing system of the present technique makes it possible to transmit the superimposed image to a user of the image processing apparatus 40 via the surface of projection without visual recognition of a person who views the surface of projection.

<4. First Application Example of Image Projection System>

Figure 12:
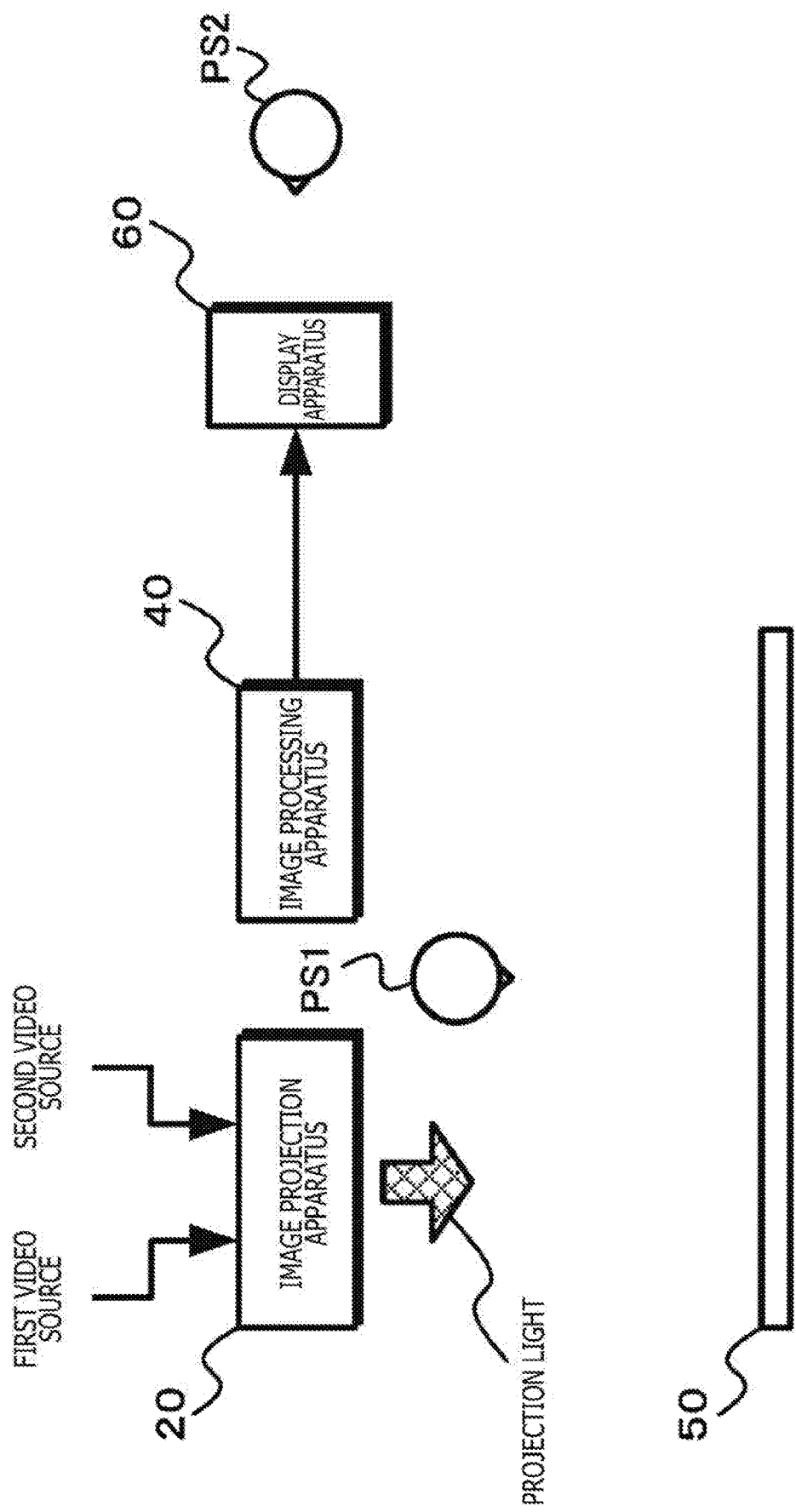
FIG. 12 is a diagram depicting a first application example of the image projection system.

A first application example of the image projection system will next be described. FIG. 12 depicts the first application example of the image projection system. Two different arbitrary video sources are supplied to the image projection apparatus 20. A first video source indicates the projected image and is input to the projected image light generation section 21. In addition, the second video source indicates the superimposed image and is input to the superimposed image input section 24. Therefore, a person PS1 can visually recognize only the image of the first video source by an image projected onto the surface of projection 50 by the naked eye.

Furthermore, the image processing apparatus 40 images the surface of projection and generates the reconstructed image. Alternatively, in generating the reconstructed image, the image processing apparatus 40 can generate the reconstructed image equivalent to the superimposed image by performing the conversion in the opposite direction corresponding to the conversion process performed by the image projection apparatus 20 for converting each pixel value into the direction of polarization. Therefore, displaying the reconstructed image on a display apparatus 60 enables a person PS2 to visually recognize the superimposed image of the second video source on the display apparatus 60.

It is noted that the superimposed image may be either an image that indicates information associated with the projected image or an image that does not indicate information associated with the projected image. It is assumed, for example, that a chart or a table is projected as the projected image and the superimposed image is an image that indicates an explanation associated with the chart or the table. This can facilitate explaining the chart or the table using information indicated by the superimposed image. It is also assumed that a question or the like is projected as the projected image and the superimposed image is an image indicating an answer. This can facilitate explaining the question. It is further assumed, for example, that a motion video content is projected as the projected image and the superimposed image is an image indicating an informative matter or the like that is not associated with the motion video content. This enables the user of the image processing apparatus 40 to be notified of the informative matter or the like by the image without the visual recognition of the person who views the projected image even in an environment in which a sound is hard to hear.

<5. Second Application Example of Image Projection System>

Figure 13:
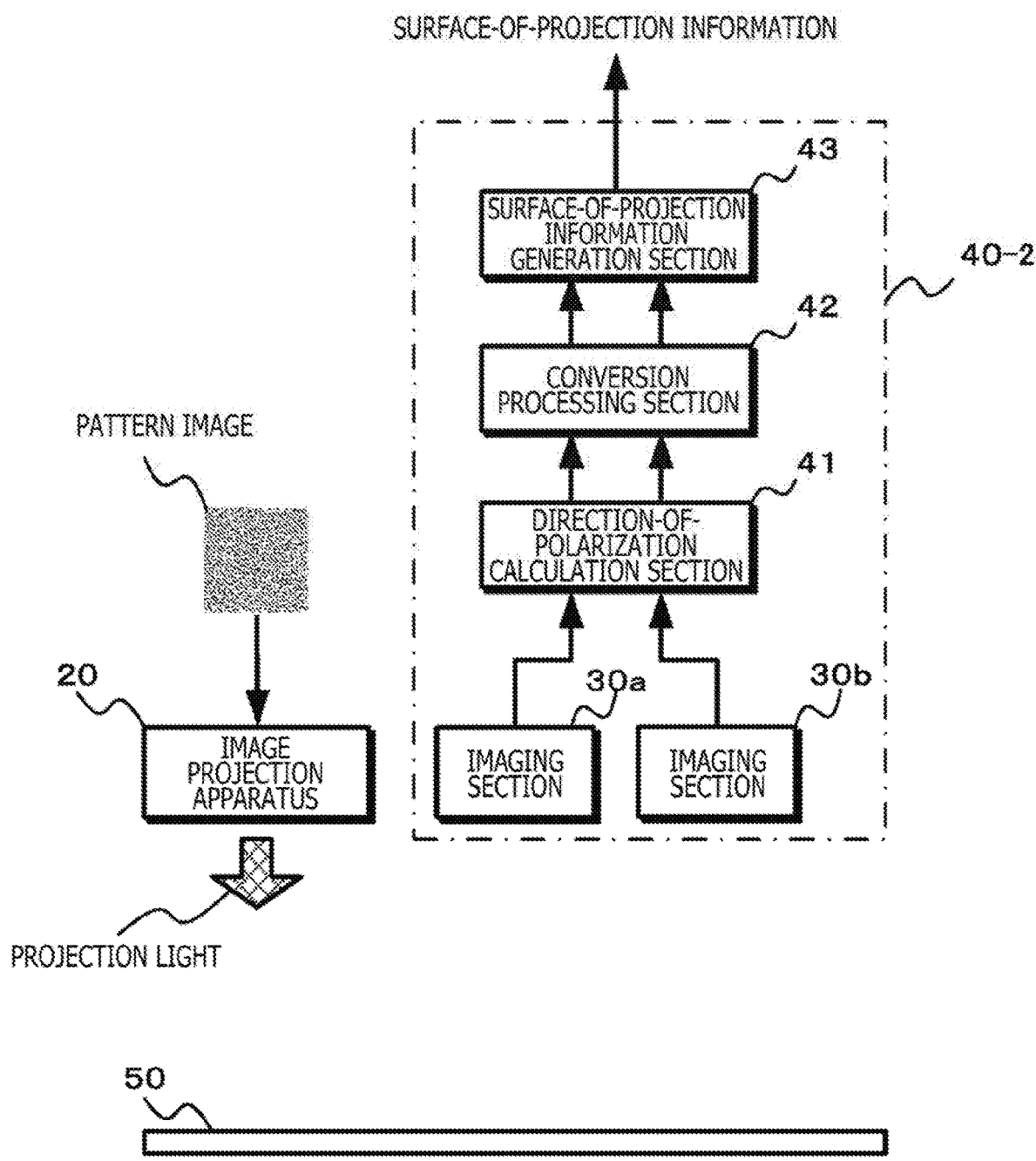
FIG. 13 is a diagram depicting a second application example of the image projection system.

FIG. 13 depicts a second application example of the image projection system. An arbitrary projected image is input to the projected image light generation section 21 in the image projection apparatus 20, and an arbitrary pattern image is input to the superimposed image input section 24. At this time, the projected image is visible on the surface of projection 50 and the pattern image is invisible thereon.

A plurality of imaging sections, for example, two imaging sections 30a and 30b are provided at different positions in an image processing apparatus 40-2, and the two imaging sections 30a and 30b image the surface of projection 50. Therefore, the imaging section 30a acquires polarization images in at least three or more directions of polarization while the imaging section 30b acquires polarization images in at least three or more directions of polarization at viewpoints different from those of the imaging section 30a.

The direction-of-polarization calculation section 41 calculates each direction of polarization using the polarization images in at least three or more directions of polarization acquired by the imaging section 30a. In addition, the direction-of-polarization calculation section 41 calculates each direction of polarization using the polarization images in at least three or more directions of polarization acquired by the imaging section 30b. It is noted that the direction-of-polarization calculation section 41 calculates each direction of polarization in units of pixels, for example, per pixel or per 2×2 pixels as described above.

The conversion processing section 42 converts the direction of polarization calculated by the direction-of-polarization calculation section 41 on the basis of the polarization images acquired by the imaging section 30a into the pixel value, and generates a first reconstructed pattern image. In addition, the conversion processing section 42 converts the direction of polarization calculated by the direction-of-polarization calculation section 41 on the basis of the polarization images acquired by the imaging section 30b into the pixel value, and generates a second reconstructed pattern image. The conversion processing section 42 outputs the generated first and second reconstructed pattern images to the surface-of-projection information generation section 43.

The surface-of-projection information generation section 43 calculates a parallax between the first reconstructed pattern image and the second reconstructed pattern image by a stereo matching process, for example, block matching or the like using the first reconstructed pattern image and the second reconstructed pattern image. Furthermore, the surface-of-projection information generation section 43 generates, as surface-of-projection information, depth information indicating a distance to each position on the surface of projection on the basis of the calculated parallax.

According to the second application example described above, the surface-of-projection information can be generated using the pattern images in an invisible state while the projected image is projected onto the surface of projection 50. Thus, it is possible to observe a shape change or the like of the surface of projection 50 in real time. Furthermore, providing the surface-of-projection information to the image projection apparatus 20 makes it possible to generate the projection light without an influence of the shape change or the like on the projected image even if the shape change or the like occurs to the surface of projection 50.

<6. Third Application Example of Image Projection System>

Figure 14:
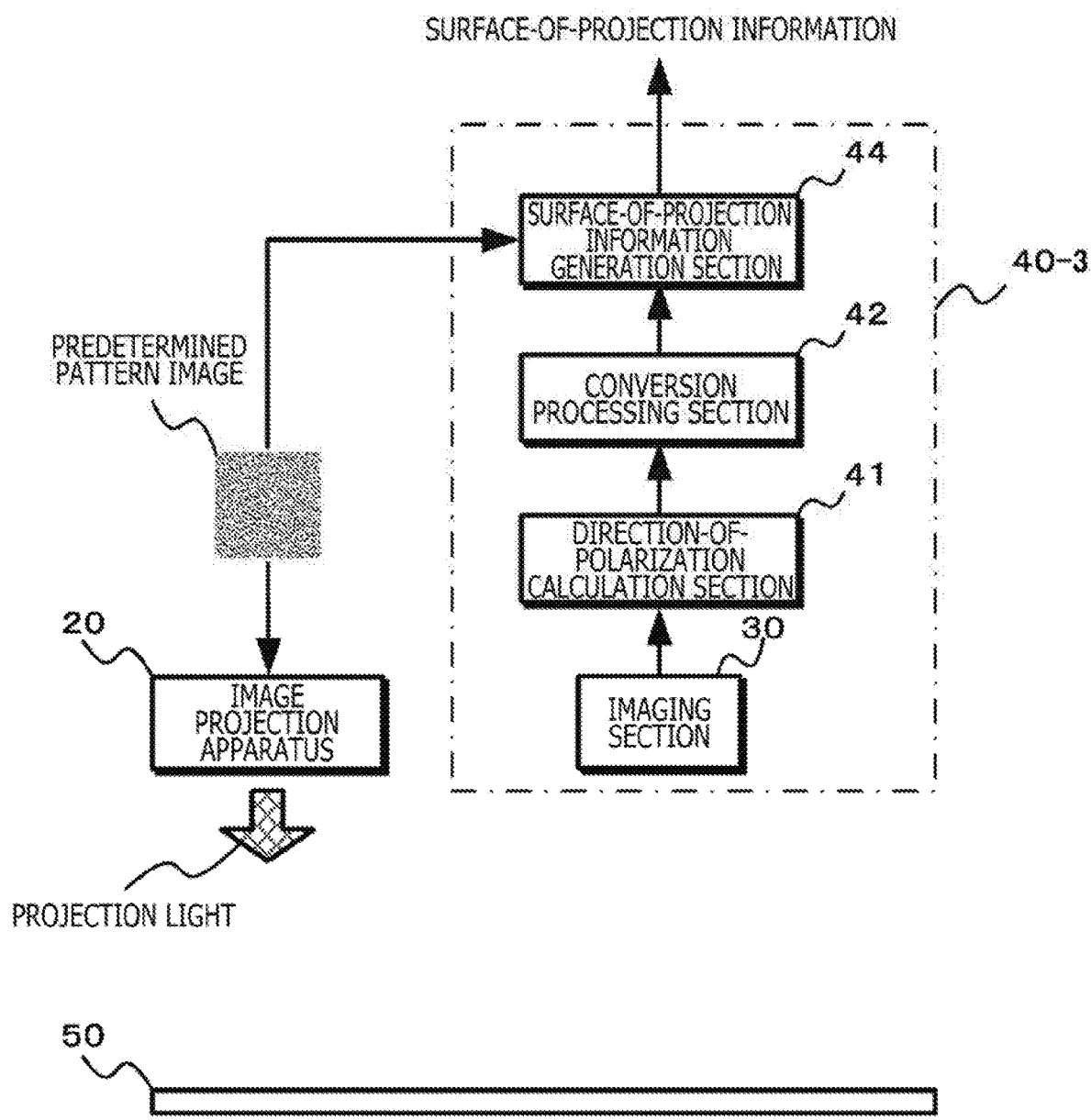
FIG. 14 is a diagram depicting a third application example of the image projection system.

FIG. 14 depicts a third application example of the image projection system. An arbitrary projected image is input to the projected image light generation section 21 in the image projection apparatus 20, and a predetermined pattern image is input to the superimposed image input section 24. At this time, the projected image is visible on the surface of projection 50 and the predetermined pattern image is invisible thereon.

The imaging section 30 provided in an image processing apparatus 40-3 images the surface of projection 50 and acquires polarization images in at least three or more directions of polarization.

The direction-of-polarization calculation section 41 calculates each direction of polarization using the polarization images in at least three or more directions of polarization acquired by the imaging section 30. It is noted that the direction-of-polarization calculation section 41 calculates each direction of polarization in units of pixels, for example, per pixel or per 2×2 pixels as described above.

The conversion processing section 42 converts the direction of polarization calculated by the direction-of-polarization calculation section 41 on the basis of the polarization images acquired by the imaging section 30 into the pixel value, and generates a reconstructed pattern image. The conversion processing section 42 outputs the generated reconstructed pattern image to a surface-of-projection information generation section 44.

The predetermined pattern image input to the superimposed image input section 24 is supplied to the surface-of-projection information generation section 44. The surface-of-projection information generation section 44 analyzes a transformation in the pattern image on the basis of the predetermined pattern image and the reconstructed pattern image using a structured light method, and generates surface-of-projection information indicating a three-dimensional shape of the surface of projection 50, a distance to the surface of projection 50, or the like.

According to the third application example described above, the surface-of-projection information can be generated using the specific pattern image in an invisible state while the projected image is projected onto the surface of projection 50. Thus, it is possible to observe the shape change or the like of the surface of projection 50 in real time. Furthermore, providing the surface-of-projection information to the image projection apparatus 20 makes it possible to generate the projection light without the influence of the shape change or the like on the projected image even if the shape change or the like occurs to the surface of projection 50.

A series of processes described in the specification can be executed by hardware, software, or a composite configuration of both the hardware and the software. In a case of executing the processes by the software, a program that records a processing sequence is installed into a memory within a computer incorporated into dedicated hardware and executed. Alternatively, a program can be executed by being installed into a general-purpose computer capable of executing various kinds of processes.

For example, the program can be recorded, in advance, in a recording medium such as a hard disk, an SSD (Solid State Drive), or a ROM (Read Only Memory). Alternatively, the program can be stored (recorded) either temporarily or persistently in a removable recording medium such as a flexible disk, a CD-ROM (Compact Disk Read Only Memory), an MO (Magneto optical) disk, a DVD (Digital Versatile Disk), a BD (Blue-Ray Disk (registered trademark)), a magnetic disk, or a semiconductor memory card. Such a removable recording medium can be provided as so-called package software.

Furthermore, the program may be not only installed from the removable recording medium into the computer but also transferred to the computer by either wireless or wired transmission from a download website via a network such as a LAN (Local Area Network) or the Internet. The computer can receive the program transferred in that way and install the program into a recording medium such as a hard disk incorporated in the computer.

The advantages described in the present specification are given as an example only, and the advantages are not limited to those described in the specification and may include additional advantages that are not described herein. In addition, the present technique is not to be interpreted while being limited to the embodiment of the technique described above. The embodiment of this technique discloses the present technique in the form of examples and it is obvious that a person ordinary skilled in the art can make revision of the embodiment or find alternatives thereto within the scope of the present technique.

In other words, reference is to be made to claims for the assessment of the scope of the present technique.

Furthermore, an image projection apparatus of the present technique can adopt the following configuration.

(1) An image projection apparatus including:
a spatial light modulation section that sets a polarization state based on a superimposed image to unpolarized light indicating a projected image, and that generates projection light.

(2) The image projection apparatus according to (1), further including:
a polarization control section that calculates a direction of polarization on the basis of a pixel value for each pixel of the superimposed image, in which
the spatial light modulation section sets the polarization state to the direction of polarization calculated by the polarization control section.

(3) The image projection apparatus according to (2), in which
the polarization control section sets the direction of polarization as a direction of polarization that varies depending on the pixel value within a range smaller than 180 degrees.

(4) The image projection apparatus according to any one of (1) to (3), further including:
a polarization cancellation section that processes image light indicating the projected image into the unpolarized light.

(5) The image projection apparatus according to any one of (1) to (4), in which
the superimposed image is an image that indicates information associated with the projected image.

(6) The image projection apparatus according to any one of (1) to (4), in which
the superimposed image is a pattern image that is not associated with the projected image.

Furthermore, an image processing apparatus of the present technique can adopt the following configuration.

(1) An image processing apparatus including:
a direction-of-polarization calculation section that calculates each direction of polarization in units of pixels using polarization images in at least three or more directions of polarization; and
a conversion processing section that converts the direction of polarization calculated by the direction-of-polarization calculation section into a pixel value, and that generates a reconstructed image.

(2) The image processing apparatus according to (1), further including:
a surface-of-projection information generation section, in which
the direction-of-polarization calculation section calculates the direction of polarization using the polarization images obtained by imaging a surface of projection, and the surface-of-projection information generation section generates surface-of-projection information associated with the surface of projection using the reconstructed image generated by the conversion processing section.

(3) The image processing apparatus according to (2), in which
the direction-of-polarization calculation section calculates the direction of polarization for each of viewpoints using the polarization images obtained by imaging the surface of projection at a plurality of the viewpoints,
the conversion processing section generates the reconstructed image for each of the viewpoints, and
the surface-of-projection information generation section generates the surface-of-projection information using the reconstructed image generated by the conversion processing section for each of the viewpoints.

(4) The image processing apparatus according to (2), in which
projection light generated by setting a polarization state based on a pattern image to unpolarized light is projected onto the surface of projection,
the conversion processing section converts the direction of polarization calculated by the direction-of-polarization calculation section into the pixel value, and generates a reconstructed pattern image, and
the surface-of-projection information generation section generates the surface-of-projection information using the pattern image and the reconstructed pattern image generated by the conversion processing section.

(5) The image processing apparatus according to any one of (2) to (4), in which
the surface-of-projection information is depth information associated with the surface of projection.

(6) The image processing apparatus according to any one of (1) to (5), further including:
an imaging section that acquires the polarization images.

(7) The image processing apparatus according to (6), in which
the imaging section has a polarizing plate that is rotatably provided on a subject light incidence surface.

(8) The image processing apparatus according to (6), in which
the imaging section has a polarized light filter that is provided on an incidence surface of an imaging element and that is in a pixel array containing polarization pixels in at least three or more directions of polarization.

(9) The image processing apparatus according to (6), in which
the imaging section is provided as at least three or more imaging sections, and polarizing plates having different directions of polarization each other are provided on subject light incidence surfaces of the imaging sections.

INDUSTRIAL APPLICABILITY

In the image projection apparatus, the image processing apparatus, the image projection method, the image processing method, and the image projection system of this technique, the projection light is generated by performing the spatial light modulation for setting the polarization state based on the superimposed image to the unpolarized light indicating the projected image. Furthermore, each direction of polarization is calculated in units of pixels using polarization images in at least three or more directions of polarization acquired by imaging the surface of projection onto which the generated projection light is projected, and the reconstructed image is generated by converting the calculated direction of polarization into a pixel value. Owing to this, it is possible to generate the projection light indicating the superimposed image invisibly superimposed on the projected image, and to visibly reconstruct the superimposed image from the captured image of the surface of projection onto which the projection light is projected. Therefore, this technique is suited for an image projection system for projecting an image content of a moving image or a still image.

REFERENCE SIGNS LIST

10 . . . Image projection system
20 . . . Image projection apparatus
21 . . . Projected image light generation section
22 . . . Polarization cancellation section
23 . . . Spatial light modulation section
24 . . . Superimposed image input section
25 . . . Polarization control section
26 . . . Projection lens
30, 30-1 to 30-3, 30-41 to 30-44, 30a, 30b . . . Imaging section
31 . . . Imaging element
32 . . . Polarizing plate
33 . . . Polarized light filter
34 . . . Color mosaic filter
40, 40-2, 40-3 . . . Image processing apparatus
41 . . . Direction-of-polarization calculation section
42 . . . Conversion processing section
43, 44 . . . Surface-of-projection information generation section
50 . . . Surface of projection
60 . . . Display apparatus

The invention claimed is:

1. An image processing apparatus, comprising:
circuitry configured to:
calculate a direction of polarization for each viewpoint of a plurality of viewpoints based on a plurality of polarization images, wherein the plurality of polarization images is obtained based on capture of a plurality of images of a surface of projection at the plurality of viewpoints;
convert the calculated direction of polarization, for each viewpoint of the plurality of viewpoints, into a pixel value;
generate a reconstructed image for each viewpoint of the plurality of viewpoints based on the pixel value; and
generate surface-of-projection information based on the reconstructed image for each viewpoint of the plurality of viewpoints, wherein the surface-of-projection information is associated with the surface of projection.

2. The image processing apparatus according to claim 1, wherein
the circuitry is further configured to:
convert, based on projection light, the calculated direction of polarization into the pixel value, wherein
the projection light is projected onto the surface of projection,
the projection light is based on a polarization state of unpolarized light, and
the polarization state of the unpolarized light is set based on a pattern image;
generate a reconstructed pattern image based on the pixel value; and
generate the surface-of-projection information based on the pattern image and the reconstructed pattern image.

3. The image processing apparatus according to claim 1, wherein the surface-of-projection information is depth information associated with the surface of projection.

4. The image processing apparatus according to claim 1, wherein the circuitry is further configured to
acquire, via an imaging section, the plurality of polarization images.

5. The image processing apparatus according to claim 4, wherein the imaging section has a polarizing plate that is rotatably provided on a subject light incidence surface of the imaging section.

6. The image processing apparatus according to claim 4, wherein
the imaging section has a polarized light filter on an incidence surface of an imaging element of the imaging section, and
the polarized light filter is in a pixel array including a plurality of polarization pixels in at least three directions of polarization.

7. The image processing apparatus according to claim 4, wherein
the imaging section is configured with at least three imaging sections, and
a plurality of polarizing plates having different directions of polarization is provided on subject light incidence surfaces of the at least three imaging sections.

8. An image processing method, comprising:
calculating a direction of polarization for each viewpoint of a plurality of viewpoints based on a plurality of polarization images, wherein the plurality of polarization images is obtained based on capture of a plurality of images of a surface of projection at the plurality of viewpoints;
converting the calculated direction of polarization, for each viewpoint of the plurality of viewpoints, into a pixel value;
generating a reconstructed image for each viewpoint of the plurality of viewpoints based on the pixel value; and
generating surface-of-projection information based on the reconstructed image for each viewpoint of the plurality of viewpoints, wherein the surface-of-projection information is associated with the surface of projection.

9. The image processing method according to claim 8, further comprising:
converting, based on projection light, the calculated direction of polarization into the pixel value, wherein
the projection light is projected onto the surface of projection,
the projection light is based on a polarization state of unpolarized light, and
the polarization state of the unpolarized light is set based on a pattern image;
generating a reconstructed pattern image based on the pixel value; and
generating the surface-of-projection information based on the pattern image and the reconstructed pattern image.

10. The image processing method according to claim 8, wherein the surface-of-projection information is depth information associated with the surface of projection.

11. The image processing method according to claim 8, further comprising acquiring, by an imaging section, the plurality of polarization images.

12. The image processing method according to claim 11, wherein
the imaging section has a polarized light filter on an incidence surface of an imaging element of the imaging section, and
the polarized light filter is in a filter array including a plurality of polarization pixels in at least three directions of polarization.

13. The image processing method according to claim 11, wherein
the imaging section is configured with at least three imaging sections, and
a plurality of polarizing plates having different directions of polarization is provided on subject light incidence surfaces of the at least three imaging sections.

14. The image processing method according to claim 11, wherein the imaging section has a polarizing plate that is rotatably provided on a subject light incident surface of the imaging section.

15. An image projection system, comprising:
an image projection apparatus and an image processing apparatus, wherein the image projection apparatus includes first circuitry configured to:
set a polarization state of unpolarized light based on a superimposed image, wherein the unpolarized light indicates a projected image; and
generate projection light based on the polarization state, and the image processing apparatus includes second circuitry configured to:
calculate a direction of polarization for each viewpoint of a plurality of viewpoints based on a plurality of polarization images, wherein
the plurality of polarization images is obtained based on capture of a plurality of images of a surface of projection at the plurality of viewpoints, and
the projection light is projected onto the surface of projection;
convert the calculated direction of polarization, for each viewpoint of the plurality of viewpoints, into a pixel value;
generate a reconstructed image for each viewpoint of the plurality of viewpoints based on the pixel value, wherein the reconstructed image indicates the superimposed image; and
generate surface-of-projection information based on the reconstructed image for each viewpoint of the plurality of viewpoints, wherein the surface-of-projection information is associated with the surface of projection.

16. The image projection system according to claim 15, wherein
the first circuitry is further configured to project the projection light, or
the second circuitry is further configured to set an angle of view at a time of capture of the surface of projection so that a to-be-imaged region imaged with pixels in a minimum unit region is one of equal to or smaller than a minimum modulation region on the surface of projection, and
the direction of polarization is calculated in the minimum unit region at the time of capture of the surface of projection.

* * * * *